United States Patent Office 3,326,867
Patented June 20, 1967

3,326,867
FLUORINATED ETHYLENICALLY UNSATURATED ORGANIC SULFIDE COMPOUNDS AND POLYMERS
John F. Harris, Jr., Wilmington, Del., assignor to E. I. du Pont de Nemours and Company, Wilmington, Del., a corporation of Delaware
No Drawing. Filed May 4, 1961, Ser. No. 107,662
The portion of the term of the patent subsequent to Aug. 7, 1979, has been disclaimed
16 Claims. (Cl. 260—79.7)

This invention relates to novel fluorinated organic sulfides, to their preparation, and to polymers obtained from them. More particularly, this invention relates to novel fluorinated ethylenically unsaturated organic sulfides, to their preparation, and to polymers thereof.

The present application is a continuation-in-part of Harris Ser. No. 855,279, now abandoned, which was filed Nov. 25, 1959, and was copending at the time of filing the instant application.

Organic sulfides are a well-known class of compounds which are also called thioethers. The compounds are characterized by a divalent sulfur atom bonded to two organic groups. Organic sulfides in which the organic groups are substantially hydrocarbon have been studied extensively and attention has also been given to sulfides in which the organic groups bear a limited number of substituents. However, there is very little known about highly fluorinated organic sulfides. In particular, organic sulfides which have, as substituent groups on the sulfur, a highly fluorinated alkyl group and a polymerizable vinyl group bonded to fluorine or fluorinated alkylthio radicals, are unknown. The preparation and characterization of this previously unknown class of compounds represents an advance in useful knowledge and it is with this class of compounds that the present invention is concerned.

It is an object of this invention to provide new fluorinated organic sulfides. A further object of this invention is to provide fluorinated unsaturated organic sulfides containing a novel combination of a highly fluorinated alkyl group and a polymerizable vinyl group and methods for their preparation. A further object is to provide novel polymers of these new fluorinated organic sulfides. Still another object is to provide novel polymers of fluorinated organic sulfides which are useful as treating agents for porous materials to impart water-repellent properties thereto. Other objects will appear hereinafter.
invention which provides a new class of polyfluorinated These and other objects are accomplished by the present organic sulfides which are ethylenic compounds having a monovalent polyfluoroalkylthio group bonded to one of the ethylenic carbons and bonded to the same carbon either hydrogen, a halogen of atomic number of at least 9 and not more than 35 (i.e., fluorine, chlorine, or bromine) or a polyfluoroalkylthio group; the other ethylenic carbon has one valence satisfied by fluorine or a polyfluoroalkylthio group and the remaining valence satisfied by hydrogen, a halogen of atomic number of at least 9 and not more than 35, a polyfluoroalkylthio group, a hydrocarbylthio group, a hydrocarbyloxy group, or a di(hydrocarbyl)amino group. Each of the aforesaid monovalent polyfluoroalkylthio groups contains divalent sulfur bonded through one valence to a polyfluoroalkyl group consisting of carbon and fluorine and at most one hydrogen or chlorine, which, if present, is on the omega carbon.

The new organic sulfides of this invention have the following structural formula:

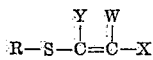

wherein R is a polyfluorinated alkyl group having bonded to the terminal carbon atom at most one hydrogen or chlorine, i.e., ω-hydro or chloro, the remaining elements in said polyfluorinated alkyl group being carbon and fluorine; Y is hydrogen, a halogen of atomic number of at least 9 and not more than 35 (i.e., fluorine, chlorine, or bromine) or an RS group; W is fluorine or an RS group; and X is hydrogen, a halogen of atomic number of at least 9 and not more than 35 (i.e., fluorine, chlorine, or bromine), an RS, or R'S, R'O, or R'$_2$N group, wherein R' is a hydrocarbon radical. In this formula, each R is a perfluoroalkyl group, omega-hydroperfluoroalkyl group, or omega-chloroperfluoroalkyl group, which polyfluorinated alkyl group in a preferred form of the invention is of at most 8 carbons; and each R' moiety of X is a hydrocarbon group which can be alkyl, alkenyl, alkynyl, cycloalkyl, aryl, aralkyl or alkaryl, and which in a preferred form of the invention is of at most 12 carbons. For expediency, R' will usually not be more than 8. In specially preferred forms of the invention, Y and X are fluorine or RS.

This invention is generic to the new fluorinated organic sulfides, including fluorovinyl organic sulfides, and to polymers obtainable from these fluorovinyl organic sulfides. The polymers, i.e., the homopolymers and copolymers, obtained by polymerization of the new fluorovinyl organic sulfides form a part of this invention.

The new polyfluorinated unsaturated organic sulfides can be obtained by processes which comprise dehalogenation or dehydrohalogenation of saturated polyfluorinated organic sulfides which are halogenated ethanes bearing from one to four omega-hydroperfluoroalkylthio, omega-chloroperfluoroalkylthio or perfluoroalkylthio substituents, at least one halogen, and at most two hydrogens of which at most one is bonded to each ethano carbon. These new polyfluorinated ethylenic sulfides can also be obtained by reaction of a bis(polyfluoroalkylthio)acetylene with a polyfluoroalkanethiol, a polyfluoroalkanesulfenyl halide, a hydrocarbylthiol, a hydrocarbylsulfenyl halide, a hydrocarbyl alcohol, or a di(hydrocarbyl)amine. The processes of preparation and the general structure of the organic sulfides which are employed in each process are described more fully hereinafter.

Examples of monomeric fluorinated organic sulfides which fall within the scope of this invention are as follows:

pentafluoroethyl trifluorovinyl sulfide,
1,1,2,2-tetrafluoroethyl 1-chloro-2,2-difluorovinyl sulfide,
3-chlorohexafluoropropyl trifluorovinyl sulfide,
perfluoroisobutyl trifluorovinyl sulfide,
8H-perfluorooctyl trifluorovinyl sulfide,
trifluoromethyl 1-bromo-2,2-difluorovinyl sulfide,
trifluoromethyl 1,2-dichloro-2-fluorovinyl sulfide,
12H-perfluorododecyl trifluorovinyl sulfide,
trifluoromethyl 1,2-dibromo-2-fluorovinyl sulfide,
chlorodifluoromethyl trifluorovinyl sulfide,
3H-hexafluoropropyl 1-bromo-2,2-difluorovinyl sulfide,
perfluoroisopropyl trifluorovinyl sulfide,
1,2-difluoro-1,2-bis(trifluoromethylthio)ethylene,
1,2-bis(trifluoromethylthio)-2-(perfluorooctylthio) ethylene,
1-(6-chloroperfluorohexylthio)-2-(trifluoromethylthio)-2-(n-butylthio)ethylene,
1-(3-chloroperfluoropropylthio)-2-(trifluoromethylthio)-2-(cyclohexylthio)ethylene,
1-(perfluorooctylthio)-2-(trifluoromethylthio)-2-(allylthio)ethylene,
1-(perfluoroethylthio)-2-(trifluoromethylthio)-2-(benzylthio)ethylene,
1-(trifluoromethylthio)-2-(perfluorobutylthio)-2-p-(tolylthio)ethylene,
1,2-bis(trifluoromethylthio)-2-(2-naphthylthio)ethylene,
1,2-bis(trifluoromethylthio)-2-(neopentoxy)ethylene, 1-(6H-perfluorohexylthio)-2-(trifluoromethylthio)-2-cyclobutoxy)ethylene,
1-(8-chloroperfluorooctylthio)-2-(trifluoromethylthio)-2-(2-butenyl-1-oxy)ethylene,
1,2-bis(trifluoromethylthio)-2-(propargyloxy)ethylene,
1,2-bis(trifluoromethylthio)-2-(p-tolyoxy)ethylene,
1-(perfluoroethylthio)-2-(trifluoromethylthio)-2-(m-phenylphenoxy)ethylene,
1,2-bis(trifluoromethylthio)-2-(diethylamino)ethylene,
1,2-bis(trifluoromethylthio)-2-(N-methyl-N-octylamino)ethylene, and
1,2-bis(trifluoromethylthio)-2-(N-methylanilino)ethylene.

Compounds, such as these, having polyfluoroalkylthio substituents containing up to 12 carbon atoms are entirely practical, since suitable polyfluoroalkyl intermediates are presently available for their preparation.

The new monomeric compounds of this invention are generally thermally stable, non-corrosive materials which can be stored in conventional containers of glass or metals. Normal precautions should be taken to prevent undue inhalation of the vapors of the compounds or to avoid unnecessary or prolonged contact with the skin. The compounds have a relatively mild odor which is not obnoxious. The compounds are usually colorless liquids or low-melting solids which can be distilled with little or no decomposition. They are soluble in the conventional organic solvents, e.g., acetone, alcohol, dimethylformamide, ether, benzene, octane, cyclohexane, and the like. The compounds are solvents for polymeric materials, e.g., low-melting poly(tetrafluoroethylene)resin.

The new fluorovinyl organic sulfides, of the formula indicated below, are polymerizable monomers. They can, when polymerized alone, form homopolymers or, when polymerized with other polymerizable monomers, such as monomeric ethylenically unsaturated polymerizable compounds, form copolymers. To illustrate, the new compounds form copolymers with styrene, methyl methacrylate, acrylonitrile, divinylbenzene, hexafluoropropene, butadiene, tetrafluoroethylene, chlorotrifluoroethylene, and the like. The polymers, including homopolymers and copolymers, have as a characteristic recurring unit the structure

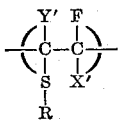

in which R has the meaning given hereinbefore, X' is hydrogen, fluorine, chlorine or bromine, and Y' is fluorine, chlorine or bromine.

The polymers obtained from the fluorovinyl sulfides can have a wide range of molecular weights. The molecular weights may be relatively low, e.g., 1000 or lower, or they can be of intermediate range, e.g., 5000 to 20,000, or the molecular weights may be as high as 50,000 or more. The degree of polymerization, i.e., the molecular weight, of the polymer is determined to some extent by the conditions of polymerization. In general, the polymers which are obtained have molecular weights of about 1000 to 20,000.

Polymerization of the monomers is accomplished by conventional and well-known methods, e.g., by photochemical action.

In physical characteristics, the polymers range form clear low-melting tacky products to clear, tough and tack-free materials which soften at relatively high temperatures. The polymers are soluble in many organic liquids, including dimethylformamide, tetrahydrofuran, tetrahydrothiophene-1,1-dioxide, and butyrolactone. The polymers are useful in coating compositions for porous objects including fabrics, wood, brick and stone.

The following examples, in which parts are by weight, illustrate the details of preparing representative compounds of the invention. The initial reactants, i.e., the saturated halogenated sulfides, are obtained by conventional methods which are also illustrated for representative sulfides in the examples.

EXAMPLE I

A. 1,2,2-trifluoroethyl trifluoromethyl sulfide

A mixture of 64 parts of trifluoromethanethiol and 51 parts of trifluoroethylene is loaded into a quartz reaction vessel, the length of which is six times its diameter, and which is fitted with a condenser containing a solid carbon dioxide-acetone mixture. While the mixture is refluxing, it is irradiated with a spiral-shaped low pressure, quartz mercury resonance lamp, which is fitted around the outside of the reactor. After a period of irradiation of about 25 minutes, the resulting mixture is distilled through a large spinning band still. There is obtained 86 parts (75% of theory) of product distilling at 46–51° C. (mostly 50–51° C.). The fluorine nuclear magnetic resonance pattern of the lower boiling (46–50° C.) portion of this material indicates that it is a mixture, the major component of which is 1,2,2-trifluoroethyl trifluoromethyl sulfide. The minor component is the isomeric 1,1,2-trifluoroethyl trifluoromethyl sulfide. The fluorine nuclear magnetic resonance pattern of the fraction boiling at 50–51° C. confirms that it is pure 1,2,2-trifluoroethyl trifluoromethyl sulfide.

*Analysis.*—Calc'd for $C_3H_2F_6S$: F, 61.9; S, 17.4. Found: F, 62.1; S, 17.3.

B. 1-chloro-1,2,2-trifluoroethyl trifluoromethyl sulfide

Chlorine (dried by passage through concentrated sulfuric acid) is passed through 1,2,2-trifluoroethyl trifluoromethyl sulfide which is being refluxed and irradiated with an ultraviolet lamp. Distillation of the reaction mixture yields 1-chloro-1,2,2-trifluoroethyl trifluoromethyl sulfide ($C_3HClF_6S$; B.P. 62° C.; $N_D^{25}$, 1.3380) and 1,2-dichloro-1,2,2-trifluoroethyl trifluoromethyl sulfide ($C_3Cl_2F_6S$; B.P. 84° C.; $n_D^{24}$, 1.3560).

*Analysis.*—Calc'd for $C_3HClF_6S$: S, 14.7; Cl, 16.2. Found: S, 14.7; Cl, 16.0.

*Analysis.*—Calc'd for $C_3Cl_2F_6S$: Cl, 28.0; F, 45.0; S, 12.7. Found: Cl, 27.7; F, 45.2; S, 12.5.

C. Trifluorovinyl trifluoromethyl sulfide

A glass reaction vessel is employed which is equipped with an addition funnel and a short path still head joined to a trap cooled with a solid carbon dioxide-acetone mixture. The vessel is charged with 25 parts of potassium hydroxide and it is then heated to 130–135° C. The addition funnel is adjusted to bring its tip below the surface of the melted potassium hydroxide and 10 parts of 1-chloro-1,2,2-trifluoroethyl trifluoromethyl sulfide is added over a period of 20 minutes to the potassium hydroxide which is maintained at 130–135° C. The reaction products pass through the still head and are collected in the trap. There is obtained 5.48 parts of liquid products which are distilled through an efficient fractionating column to yield a small amount of trifluoromethyl trifluorovinyl sulfide, boiling at 18–20° C. The compound, whose structure is confirmed by the nuclear magnetic resonance spectrum, has the formula $CF_3—S—CF=CF_2$.

EXAMPLE II

Using a reaction vessel and procedure described in Example I, 33.5 parts of 1,2,2-trifluoroethyl trifluoromethyl sulfide (prepared as in Example I-A) is added over a period of 0.5 hour to 50 parts of potassium hydroxide at 130–135° C. There is collected in the trap 27.35 parts of reaction products which are distilled through an efficient fractionating column. There is obtained 6.82 parts of trifluoromethyl 1,2-difluorovinyl sulfide, boiling at 37–38° C.; $n_D^{25}$, 1.3271. The identity of the compound, which has the structure $CF_3—S—CF=CFH$, is confirmed by the nuclear magnetic resonance spectrum and by elemental analysis.

*Analysis.*—Calc'd for $C_3HF_5S$: C, 22.0; H, 0.6; F, 57.9; S, 19.5. Found: C, 23.0; H, 1.1; F, 57.9; S, 19.5.

In the fractional distillation of the crude liquid reaction products, there is obtained 3.32 parts of foreshots, boiling at 22–37° C., $n_D^{25}$, 1.3249, which are shown by gas chromatography to contain about 85% of trifluoromethyl 1,2-difluorovinyl sulfide. About 12 parts of the starting reactant, boiling up to 57° C., are recovered.

EXAMPLE III

A. *1,1,2-trifluoro-2-chloroethyl trifluoromethyl sulfide*

A mixture of 20 parts of trifluoromethanethiol and 40 parts of chlorotrifluoroethylene is irradiated as described in Example I-A. Upon distillation of the reaction mixture through a large spinning band still, there is obtained 26.6 parts (62% of theory) of 2-chloro-1,1,2-trifluoroethyl trifluoromethyl sulfide distilling at 66–67° C., $n_D^{25}$, 1.3339–1.3341.

*Analysis.*—Calc'd for $C_3HClF_6S$: C, 16.5; H, 0.5; F, 52.1. Found: C, 16.7; H, 0.6; F, 52.3.

B. *2-chloro-1,2-difluorovinyl trifluoromethyl sulfide*

Using a reaction vessel and procedure described in Example I-C, 15 parts of 2-chloro-1,1,2-trifluoroethyl trifluoromethyl sulfide are reacted with 25 parts of potassium hydroxide at 130–135° C.

The reaction is repeated using 38.4 parts of the sulfide and 25 parts of potassium hydroxide.

The reaction products are combined and distilled to yield 9.2 parts of a water-white fraction boiling at 40–57° C.; $n_D^{25}$, 1.3493. This fraction is carefully distilled through an efficient fractionating column to yield 2-chloro-1,2-difluorovinyl trifluoromethyl sulfide, boiling at 58–61° C.; $n_D^{25}$, 1.3588. A sample of this fraction, purified by gas chromatography, distills sharply at 57° C. The identity of the compound, which has the formula $CF_3-S-CF=CFCl$, is confirmed by the nuclear magnetic resonance spectrum. The compound is also characterized by an unsaturation band at 6.05 microns in the infrared.

*Analysis.*—Calc'd for $C_3F_5ClS$: F, 47.8; Cl, 17.9. Found: F, 48.4; Cl, 17.0.

EXAMPLE IV

A. *1,2,2-trifluoroethyl 1,1,2,2-tetrafluoroethyl sulfide*

A mixture of 18 parts of 1,1,2,2-tetrafluoroethanethiol prepared by the X-ray initiated addition of hydrogen sulfide to tetrafluoroethylene and 15 pars of trifluoroethylene is irradiated for a period of 18 hours as described in Example I-A. Upon distillation of the reaction mixture through a small spinning band still, there is obtained 20.3 parts of 1,2,2-trifluoroethyl 1,1,2,2-tetrafluoroethyl sulfide distilling at 104–105° C., $n_D^{25}$, 1.3383.

*Analysis.*—Calc'd for $C_4H_3F_7S$: F, 61.5; S, 14.8. Found: F, 61.2; S, 15.4.

B. *1,2-difluorovinyl 1,1,2,2-tetrafluoroethyl sulfide*

A mixture of 10 parts of 1,2,2-trifluoroethyl 1,1,2,2-tetrafluoroethyl sulfide and 6 parts of potassium hydroxide, contained in a vessel fitted with a short path distillation head connected to a solid carbon dioxide-acetone cooled trap, is heated to 125–130° C. for a period of 2 hours. The trap contents (7.33 parts, 81% of theory) are dried over a mixture of anhydrous magnesium sulfate and calcium chloride and then distilled through a spinning band still. There is obtained 5.60 parts of 1,2-difluorovinyl 1,1,2,2-tetrafluoroethyl sulfide as a water-white liquid distilling at 86–88° C.; $n_D^{25}$, 1.3528–1.3541. The nuclear magnetic resonance spectrum confirms the assigned structure. The compound is also characterized by an unsaturation band at 6.1 microns in the infrared.

*Analysis.*—Calc'd for $C_4H_2F_6S$: F, 58.1; S, 16.3. Found: F, 58.0; S, 16.2.

EXAMPLE V

*1,2-bis(trifluoromethylthio)ethylene*

A solution of 10.1 parts of potassium hydroxide in 47 parts of anhydrous ethanol is added during 20 minutes to a solution, cooled to 5° C., of 47.5 parts of 1-bromo-1,2-bis(trifluoromethylthio)ethane in 39.5 parts of absolute ethanol. The reaction mixture is kept below 30° C., and after being stirred for 30 minutes it is poured into a large excess of ice water. The organic layer is washed with water, dried over magnesium sulfate and distilled. There is obtained 13.5 parts (38%) of 1,2-bis(trifluoromethylthio)ethylene as a colorless liquid distilling at 92–98° C. The presence of two isomers in a ratio of 3:1 is shown by a gas chromatogram of the product. The isomers, purified by gas chromatography, are characterized and identified as follows: cis isomer—B.P. 97° C., $n_D^{24}$ 1.3832, infrared absorption at 3.25 microns (CH), 6.4 microns (SC=C), 13.2 microns (SCF$_3$) and 14-micron region (HC=CH); trans isomer—B.P. 96.5° C., $n_D^{24}$ 1.3886, infrared absorption at 3.25 microns (CH), 10.8 microns (HC=CH), and 13.2 microns (SCF$_3$).

*Analysis.*—Calc'd for $C_4H_2F_6S_2$: F, 50.0; S, 28.1. Cis, found: F, 49.3; S, 28.0. Trans, found: F, 49.3; S, 28.0.

Examples I–V illustrate the preparation of typical compounds of the invention employing a dehydrohalogenation process. Organic sulfides of the type described earlier which have hydrogen bonded to a carbon of the ethano group are usually operable in the process. For example, by using the process of Examples I–V, omega-hydroperfluoropropyl trifluorovinyl sulfide is obtained from omega-hydroperfluoropropyl 1-chloro-1,2,2-trifluoroethyl sulfide, omega-chloroperfluorooctyl 1,2-difluorovinyl sulfide is obtained from omega-chloroperfluorooctyl-1,2,2-trifluoroethyl sulfide, chlorodifluoromethyl 2-bromo-1,2-difluorovinyl sulfide is obtained from chlorodifluoromethyl 2-bromo-1,1,2-trifluoroethyl sulfide, 1,1,2,2-tetrafluoroethyl 1,2-difluorovinyl sulfide is obtained from 1,1,2,2-tetrafluoroethyl 1,2,2-trifluoroethyl sulfide and 1-(perfluoromethylthio)-2-porfluoroethylthio)ethylene is obtained from 1-chloro-1-(perfluoromethylthio)-2-(perfluoroethylthio)ethane.

EXAMPLE VI

A glass reaction vessel is employed which is equipped with a thermometer, an addition funnel and a reflux condenser through which water at a temperature of 35–40° C. is circulating. The condenser is connected to a trap cooled with a solid carbon dioxide-acetone mixture and fitted with a tube charged with calcium chloride. The reaction vessel is charged with 22 parts of methanol, 5.8 parts of zinc dust and 0.02 part of granular zinc chloride. The reaction mixture is heated to refluxing temperature and a solution of 20.8 parts 1,2-dichlorotrifluoroethyl trifluoromethyl sulfide in 10 parts of methanol is added dropwise. After addition is completed, the mixture is refluxed for 1.5 hours.

The reaction is repeated as described above except 20.4 parts of 1,2-dichlorotrifluoroethyl trifluoromethyl sulfide is employed.

The reaction products from both runs which are collected in the traps are combined and they are distilled through an efficient fractionating column equipped with a condenser through which methanol cooled with solid carbon dioxide is circulating. There is obtained 14.2 parts of trifluoromethyl trifluorovinyl sulfide, boiling at 18.0–18.5° C. The compound is characterized by an unsaturation band at 5.71 microns in the infrared.

*Analysis.*—Calc'd for $C_3F_6S$: S, 17.6. Found: S, 18.2.

Example VI illustrates the method of preparing the new compounds by a dehalogenation process. This method of preparation is particularly useful when the initial reactant is an organic sulfide as defined earlier in which the ethano group bears on each carbon a halogen of atomic number 17–35, inclusive. Examples of other polyfluorinated unsaturated organic sulfides which may be prepared by the process of Example VI are perfluorobutyl trifluorovinyl sulfide from perfluoro butyl 1,2-dichloro-1,2,2-trifluoroethyl sulfide, difluoromethyl trifluorovinyl sulfide from difluoromethyl 1,2-dibromo-1,2,2-trifluoroethyl sulfide, omega-hydroperfluorohexyl trifluorovinyl sulfide from omega-hydroperfluorohexyl 1,2-dichloro-1,2,2-trifluoroethyl sulfide and 1,2-bis(3-chloroperfluoropropylthio)ethylene from 1,2-dichloro-1,2-bis(3-chloroperfluoropropylthio)ethane.

EXAMPLE VII

Tris(trifluoromethylthio)ethylene

A mixture of 19.6 parts of bis(trifluoromethylthio)-acetylene and 32 parts of trifluoromethanethiol is irradiated for a period of 3 days as described in Example I–A. Upon distillation of the reaction mixture there is obtained 11.1 parts (39%) of tris(trifluoromethylthio)ethylene distilling at 42–47.5° C. under a pressure of 31 mm. of mercury; $n_D^{25}$ 1.4004–1.4013. The compound is characterized by an unsaturation band at 6.5 microns in the infrared.

*Analysis.*—Calc'd for $C_5HF_9S_3$: F, 52.0; S, 29.3. Found: F, 51.1; S, 29.8.

EXAMPLE VIII

Tris(trifluoromethylthylthio)chloroethylene

A mixture of 14.8 parts of bis(trifluoromethylthio)-acetylene and 11 parts of trifluoromethanesulfenyl chloride is irradiated for a period of 18 hours as described in Example I–A. Upon distillation of the reaction mixture there is obtained 11.3 parts (47.4%) of tris(fluoromethylthio)chloroethylene distilling at 52–60° C. under a pressure of 25 mm. of mercury; $n_D^{25}$ 1.4298–1.4308. The compound is characterized by an unsaturation band at 6.75 microns in the infrared.

*Analysis.*—Calc'd for $C_5ClF_9S_3$: Cl, 9.8; F, 47.2. Found: Cl, 10.3; F, 46.5.

EXAMPLE IX

1,2-bis(trifluoromethylthio)-2-(methoxy)ethylene

A solution of 5 parts of bis(trifluoromethylthio)acetylene in 4 parts of methanol is added dropwise to a solution of 0.25 part of sodium methoxide in 20 parts of anhydrous methanol. After the initial exothermic reaction is over the mixture is heated at 100° C. for 15 minutes, and is then poured into a large excess of water. The organic layer is removed by two extractions with 18 parts of ether. The extracts are dried over anhydrous magnesium sulfate and then distilled to obtain 3.61 parts (63%) of 1,2-bis(trifluoromethylthio)-2-(methoxy)ethylene which distills at 134–136° C., $n_D^{25}$ 1.4010.

*Analysis.*—Calc'd for $C_5H_4F_6OS_2$: C, 23.3; H, 1.6; S, 24.4. Found: C, 23.3; H, 2.2; S, 24.3.

EXAMPLE X

1,2-bis(trifluoromethylthio)-2-(morpholino)ethylene

A solution of 1.25 parts of morpholine in 7.1 parts of anhydrous ether is added to a stirred and cooled solution of 3.2 parts of bis(trifluoromethylthio)acetylene in 7.1 parts of anhydrous ether. The reaction mixture is filtered to remove a small amount of white solid, and ether is distilled from the filtrate at atmospheric pressure. The residue is distilled under reduced pressure to yield 3.07 parts (69%) of crude 1,2-bis(trifluoromethylthio)-2-(morpholino)ethylene boiling over a range of temperature up to 56° C. at 0.18 mm., $n_D^{25}$ 1.4589–1.4618. Redistillation of this product yields a purified fraction, B.P. 42–54° C./0.24 mm. and $n_D^{25}$ 1.4578.

*Analysis.*—Calc'd for $C_8H_9F_6NOS_2$: F, 36.4; S, 20.5. Found: F, 36.2; S, 19.8.

Examples VII–X illustrate the method of preparing typical compounds of the invention by addition reactions of bis(polyfluoroalkylthio)acetylenes. This method is particularly useful for preparing polyfluorinated ethylenic organic sulfides having two vicinal polyfluoroalkylthio groups and other substituents on the ethylenic carbons. For example, by using the process of Examples VII–X, 1-methylthio-1,2-bis(12-H-perfluorododecylthio)-ethylene is obtained from methanethiol and bis(12-H-perfluorododecylthio)acetylene, 1-bromo-2-phenylthio-1,2-bis(trifluoromethylthio)ethylene is obtained from benzenesulfenyl bromide and bis(trifluoromethylthio) acetylene, 1-benzyloxy-1,2-bis(trifluoromethylthio) ethylene is obtained from benzyl alcohol and bis(trifluoromethylthio)acetylene, and 1-piperidino-1,2-bis(trifluoromethylthio)ethylene is obtained from piperidine and bis-(trifluoromethylthio)acetylene.

EXAMPLE XI

A small quartz tube which is equipped with a condenser containing a mixture of solid carbon dioxide and acetone is charged with 5 parts of trifluoromethyl trifluorovinyl sulfide. The charged tube is irradiated for 2.5 days with a spiral-shaped low pressure mercury resonance lamp which is fitted around the quartz tube. Refluxing of the sulfide which occurs initially diminishes as polymerization proceeds and there is substantially no refluxing at the end of the period of irradiation. The reaction product is freed of volatile materials under reduced pressure and there is recovered 1.32 parts of the original unsaturated sulfide reactant mixed with a small amount of the dimer of the sulfide. There remains about 3.5 parts of viscous tacky product which is a polymer of trifluoromethyl trifluorovinyl sulfide.

*Analysis.*—Calc'd. for $(C_3F_6S)_x$: S, 17.6. Found: S, 18.5.

The process described in Example XI can be used to prepare homopolymers and copolymers broadly of polyfluoroalkyl polyfluorovinyl sulfides. Thus, omega-chloroperfluorooctyl, 1,2-difluorovinyl sulfide and trifluoromethyl 1,2-difluorovinyl sulfide are polymerized to soft clear polymers. Perfluorobutyl trifluorovinyl sulfide is copolymerized with styrene to yield clear products whose composition may contain from 10–90 mole percent of the fluorovinyl sulfide. Difluoromethyl trifluorovinyl sulfide and methyl methacrylate are copolymerized to yield clear products having from 10–90 mole percent of the fluorovinyl sulfide. The ratio of components in the copolymers is determined to a large extent by the proportions in which the monomers are mixed prior to irradiation.

EXAMPLE XII

Tetrakis(trifluoromethylthio)ethylene

A mixture of 10 parts of carbon tetrabromide and 40 parts of bis(trifluoromethylthio)mercury is placed in a glass reactor fitted with a dropping funnel, stirrer, and access to the atmosphere through a trap cooled in a mixture of solid carbon dioxide and acetone. The reactor is placed in an oil bath, and the bath is heated slowly. When the temperature reaches 85° C. a strongly exothermic reaction takes place, and after the reaction subsides the bath temperature is raised to 100° C. and kept there for 3 hours. Finally, the system is evacuated with a water pump, causing the product to distill from the reaction vessel into the cooled trap. The contents of the trap are distilled in a fractionating column, and 3.0 parts of impure product boiling at 62–83° C. at 74 mm. is obtained. Fractionation of this product by preparative-scale gas chromatography yields a pure fraction, B.P. 59° C./10 mm., $n_D^{25}$ 1.4205, which is identified as tetrakis(trifluoromethylthio)ethylene by nuclear magnetic resonance and elemental analysis.

*Analysis.*—Calc'd for $C_6F_{14}S_4$: C, 16.8; F, 53.3; S, 30.0. Found: C, 17.4; F, 53.9; S, 30.4.

In the dehalogenation process for preparing the compounds of the invention, organic sulfides are employed which have the following general structure:

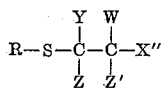

wherein R, W and Y have the meanings defined previously, i.e., R is an omega-hydroperfluoroalkyl group, an omega-chloroperfluoroalkyl group, or a perfluoroalkyl group; Y is hydrogen, a halogen of atomic number 9–35 (fluorine, chlorine or bromine) or an RS group; and W is fluorine or an RS group. X″ is hydrogen, a halogen of atomic number 9–35, or an RS group; and Z and Z′ are halogens of atomic number 17–53 (chlorine, bromine or iodine). In a preferred form of organic sulfides employed in the dehalogenation procedure, the carbons of the ethano group are hydrogen-free, i.e., X″ and Y in the above formula are halogens of atomic number 9–35 or RS groups.

In the operation of the dehalogenation process, the groups Z and Z′ in the above formula are removed by the dehalogenating agent. Powdered metals, e.g., zinc, magnesuim, copper and others, are suitable for this purpose. Zinc is a preferred dehalogenating agent. In this method of preparing the compounds, a corrosion-resistant reaction vessel is charged with the finely divided metal. A liquid reaction medium is generally added, e.g., an alcohol, ester or ether, in which the metal is maintained in suspension by agitation. The reaction mixture is heated to the desired temperature which, conveniently, can be the boiling point of the liquid medium. The organic sulfide is added dropwise to the heated reaction mixture and the combined vapors of the liquid reaction medium and the reaction products are passed through a condenser at a temperature which condenses and separates the vapors of the reaction medium from the volatile reaction products. These products are collected in a trap cooled by a suitable cooling agent, e.g., a mixture of solid carbon dioxide and acetone. The products are purified by well-known conventional methods.

In the dehydrohalogenation process for preparing the compounds of the invention, organic sulfides are employed which have the following general structure:

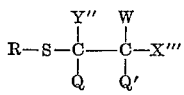

The groups R and W have the meanings described previously. X‴ is a halogen of atomic number 9–35 or an RS group; Y″ is a halogen of atomic number 9–35 or an RS group; and Q and Q′ are hydrogen or halogen of atomic number 9–53 (fluorine, chlorine, bromine or iodine) with one of Q and Q′ being hydrogen and the other being halogen.

In the operation of the dehydrohalogenation process, the groups Q and Q′ in the above formula are removed by the dehydrohalogenating agent. Alkali metal hydroxides are satisfactory dehydrohalogenating agents and they are preferred for use in the process. For example, the hydroxides of lithium, sodium or potassium can be employed satisfactorily. In this method of preparing the compounds, the alkali metal hydroxide is generally charged into a corrosion-resistant reaction vessel and the hydroxide is heated to the temperature at which it melts, generally about 130° C. or higher. The hydroxide is maintained in the molten state and the organic sulfide reactant is passed into the reaction vessel at a point below the surface of the molten hydroxide. The reaction is rapid and the reaction products, which are volatile, are passed through a condenser into a suitable receiver which is cooled sufficiently to condense the products. The reaction products are purified by conventional methods, e.g., by fractional distillation through an efficient column, by vapor phase chromatography, by chilling and crystallizing or by a combination of these and similar well-known methods.

The polymers, including homopolymers and copolymers, are soluble in many organic liquids, e.g., dimethylformamide, butyrolactone, ethylene carbonate, and the like. Solutions of the polymers obtained from the sulfide monomers are useful as treating agents for porous materials to impart water repellent properties. For example, a 10% solution of the polymer of trifluoromethyl trifluorovinyl sulfide (obtained in Example XI) in dimethylformamide is applied to cellulosic surfaces (paper, wood) and the treated surfaces are warmed until all the solvent is removed. Water applied to the treated surfaces forms droplets which are not absorbed.

The polyfluorinated ethylenic sulfides are useful as solvents for highly fluorinated polymers, e.g., the fluorinated olefin polymers. Solutions of such polymers, e.g., poly(tetrafluoroethylene), poly(chlorotrifluoroethylene), and the like in a polyfluoroalkyl fluorovinyl sulfide are useful in making cellulosic compositions waterproof. To illustrate, a 10% by weight solution of a low molecular weight, low-melting tetrafluoroethylene polymer (melting range 83–150° C.) is prepared by warming the polymer in trifluoromethyl 2-chloro-1,2-difluorovinyl sulfide until the polymer dissolves. Strips of cellulose filter paper are partly immersed (to about half the length of the paper) in the warm solution for 0.5–1.0 minute. The strips are removed, and dried in air. The treated area of the filter paper is not wet by drops of water, whereas the untreated area is immediately and completely wetted by water. The treated area of the paper does not support combustion, whereas the untreated area burns readily. Equally good results are obtained by employing approximately 10% solutions of low-melting tetrafluoroethylene polymer in 1,2-difluorovinyl trifluoromethyl sulfide, in 1-bromo-2,2-difluorovinyl trifluoromethyl sulfide, in 1,2 - bis(trifluoromethylthio)ethylene in tetrakis(trifluoromethylthio)ethylene and in 1,2-bis(trifluoromethylthio)-2-(methoxy)ethylene as treating agents for cellulose strips and cotton fabrics.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

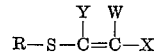

wherein R has from 1 to 12 carbons and is selected from the group consisting of perfluoroalkyl,ω-hydroperfluoroalkyl and ω-chloroperfluoroalkyl; W is selected from the group consisting of fluorine and RS; Y is selected from the group consisting of hydrogen, halogen of atomic number of at least 9 and not more than 35, and RS; and X is selected from the group consisting of Y, R′S, R′O and R′₂N, wherein R′ is a hydrocarbon radical of not more than 12 carbons and is selected from the group consisting of alkyl, alkenyl, alkynyl, cycloalkyl, aryl, aralkyl, and alkaryl.

2. An ethylenic compound wherein the four valences of the carbons are satisfied by from 0 to 3 fluorines and from 1 to 4 RS groups, wherein R is perfluoroalkyl of not more than 8 carbons.

3. An ethylenic compound wherein the four valences of the carbons are satisfied by from 0 to 3 fluorines and from 1 to 4 RS groups, wherein R is ω-chloroperfluoroalkyl of not more than 8 carbons.

4. An ethylenic compound wherein the four valences of the carbons are satisfied by from 0 to 3 fluorines and from 1 to 4 RS groups, wherein R is ω-hydroperfluoroalkyl of not more than 8 carbons.

5. A compound of the formula

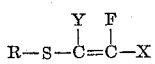

wherein X and Y are halogen of the atomic number of at least 9 and not more than 35 and R is perfluoroalkyl of not more than 12 carbons.

6. A compound of the formula

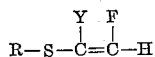

wherein Y is halogen of at least 9 and not more than 35 and R is a perfluoroalkyl group of not more than 8 carbons.

7. A compound of the formula

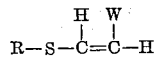

wherein W is a perfluoroalkylthio group of not more than 8 carbons, and R is a perfluoroalkyl group of not more than 8 carbons.

8. Polymers having as a recurring unit

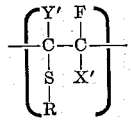

wherein X' is selected from the group consisting of hydrogen and halogen of atomic number not less than 9 and not more than 35, Y' is halogen of atomic number not less than 9 and not more than 35 and R is of not more than 12 carbons and selected from the group consisting of perfluoroalkyl, ω-hydroperfluoroalkyl and ω-chloroperfluoroalkyl.

9. Polymers according to claim 8, wherein X' is hydrogen, Y' is halogen of atomic number not less than 9 and not more than 35, and R is a perfluoroalkyl group of not more than 8 carbons.

10. Polymers according to claim 8, wherein X' and Y' are halogen of atomic number not less than 9 and not more than 35, and R is a perfluoroalkyl group of not more than 8 carbons.

11. A copolymer of a polyfluorinated organic sulfide as set forth in claim 8 with a monomeric ethylenically unsaturated polymerizable compound selected from the group consisting of styrene, methyl methacrylate, acrylonitrile, divinylbenzene, hexafluoropropene, butadiene, tetrafluoroethylene, and chlorotrifluoroethylene.

12. $CF_3SCF{=}CF_2$.
13. $HCF_2CF_2SCF{=}CFH$.
14. $CF_3SCH{=}CHSCF_3$.
15. $CF_3SCH{=}C(SCF_3)OCH_3$.
16. $(CF_3S)_2C{=}C(SCF_3)_2$.

References Cited
UNITED STATES PATENTS

| | | | |
|---|---|---|---|
| 2,908,717 | 10/1959 | Johnston | 260—609 |
| 3,006,964 | 10/1961 | Oesterling | 260—608 |
| 3,040,086 | 6/1962 | Miller | 260—79.7 |
| 3,048,569 | 8/1962 | Harris | 260—79.7 |
| 3,101,377 | 8/1963 | Bluestone | 260—609 |

JOSEPH L. SCHOFER, *Primary Examiner.*

M. LIEBMAN, JAMES A. SEIDLECK, *Examiners.*

D. K. DENENBERG, D. E. OLSON,
*Assistant Examiners.*

UNITED STATES PATENT OFFICE
CERTIFICATE OF CORRECTION

Patent No. 3,326,867                                June 20, 1967

John F. Harris, Jr.

It is hereby certified that error appears in the above numbered patent requiring correction and that the said Letters Patent should read as corrected below.

Column 1, line 49, strike out "invention which provides a new class of polyfluorinated" and insert the same after "present" in line 50, same column 1; column 5, line 51, for "pars" read -- parts --; column 6, line 42, for "-2-perfluoroethylthio" read -- -2-(perfluoroethylthio --; column 10, line 59, for "R'S" read -- R/S --.

Signed and sealed this 13th day of August 1968.

(SEAL)
Attest:

Edward M. Fletcher, Jr.                               EDWARD J. BRENNER

Attesting Officer                                         Commissioner of Patents